(12) United States Patent
Yasuda

(10) Patent No.: US 12,399,454 B2
(45) Date of Patent: Aug. 26, 2025

(54) IMAGE FORMING APPARATUS

(71) Applicant: Makoto Yasuda, Kanagawa (JP)

(72) Inventor: Makoto Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/630,156

(22) Filed: Apr. 9, 2024

(65) Prior Publication Data

US 2024/0345522 A1    Oct. 17, 2024

(30) Foreign Application Priority Data

Apr. 12, 2023  (JP) .................. 2023-065128
Feb. 13, 2024  (JP) .................. 2024-019214

(51) Int. Cl.
  *G03G 15/16* (2006.01)
  *G03G 15/00* (2006.01)
  *G06K 15/02* (2006.01)

(52) U.S. Cl.
  CPC ..... *G03G 15/5054* (2013.01); *G03G 15/1605* (2013.01); *G03G 15/5016* (2013.01); *G06K 15/1805* (2013.01)

(58) Field of Classification Search
  CPC ........... G03G 15/1605; G03G 15/5016; G03G 15/5054; G06K 15/1805
  See application file for complete search history.

(56) References Cited

U.S. PATENT DOCUMENTS

| | | | |
|---|---|---|---|
| 2007/0217801 A1* | 9/2007 | Tsuboi ............... | G03G 15/0131 399/49 |
| 2009/0148186 A1 | 6/2009 | Yasuda et al. | |
| 2012/0020687 A1* | 1/2012 | Nagayama ......... | G03G 15/0131 399/302 |
| 2013/0278943 A1 | 10/2013 | Kurosawa et al. | |
| 2015/0010337 A1 | 1/2015 | Morinaga et al. | |
| 2015/0050033 A1 | 2/2015 | Kasai et al. | |
| 2015/0370206 A1 | 12/2015 | Hitosugi et al. | |
| 2016/0070198 A1 | 3/2016 | Morinaga et al. | |

(Continued)

FOREIGN PATENT DOCUMENTS

JP   2017-021114 A   1/2017
JP   2017-207728 A   11/2017

*Primary Examiner* — Hoang X Ngo
(74) *Attorney, Agent, or Firm* — Harness, Dickey & Pierce, P.L.C.

(57) ABSTRACT

An image forming apparatus including: an image bearer; an image formation unit forming toner image on the image bearer according to image formation conditions; a transfer unit including a transfer member, transferring the toner image on the image bearer to recording medium at a transfer nip between the image bearer and the transfer member; a toner adhesion amount detection unit detecting a toner adhesion amount of a toner pattern transferred from the image bearer to the transfer member; an image formation condition adjustment unit adjusting the image formation condition, based on a detection result of the toner adhesion amount detection unit; a transfer pressure setting change unit changing a transfer pressure setting of the transfer nip; and a correction unit correcting an adjustment value of the image formation condition adjustment unit, based on a correction value corresponding to a changed transfer pressure setting by the transfer pressure setting change unit.

7 Claims, 8 Drawing Sheets

(56) References Cited

U.S. PATENT DOCUMENTS

| | | |
|---|---|---|
| 2016/0139537 A1 | 5/2016 | Kasai et al. |
| 2016/0147174 A1 | 5/2016 | Yasuda et al. |
| 2016/0170321 A1 | 6/2016 | Komori et al. |
| 2017/0199480 A1* | 7/2017 | Morinaga .......... G03G 15/0849 |
| 2020/0074598 A1 | 3/2020 | Yamamura et al. |
| 2020/0294207 A1 | 9/2020 | Yamamura et al. |
| 2023/0288859 A1 | 9/2023 | Yasuda |

* cited by examiner

SHEET CONVEYANCE DIRECTION

SHEET CONVEYANCE DIRECTION

FIG. 11

```
START → FORM EACH COLOR PATTERN (S1) → DETECT BY TONER ADHESION AMOUNT SENSOR (S2) → DETECT BY IMAGE DENSITY SENSOR (S3) → CALCULATE CORRECTION VALUE (S4) → END
```

FIG. 12

| | PRIMARY TRANSFER BIAS | SECONDARY TRANSFER BIAS | SECONDARY TRANSFER NIP PRESSURE | SECONDARY TRANSFER LINE SPEED | CORRECTION VALUE |
|---|---|---|---|---|---|
| PAPER A | 30 | 90 | 1 | 1% | α |
| PAPER B | 25 | 100 | 3 | 3% | β |
| PAPER C | 40 | 110 | 2 | 1% | γ |

IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2023-065128 and 2024-019214, filed on Apr. 12, 2023 and Feb. 13, 2024, in the Japan Patent Office, the entire disclosure of each of which is hereby incorporated by reference herein.

BACKGROUND

Technical Field

The present disclosure relates to an image forming apparatus.

Related Art

Conventionally, there is known an image forming apparatus including a toner adhesion amount detection unit detecting a toner adhesion amount of a toner pattern transferred from an image bearer to a transfer member and an image formation condition adjustment unit adjusting image formation conditions, based on a detection result of the toner adhesion amount detection unit.

There has been a case where the relationship between the detection results of the adhesion amount detection unit and the image density is collapsed, and the image density of the output image deviates from the target density.

SUMMARY

An image forming apparatus according to embodiments of the present invention includes: an image bearer; an image formation unit that forms a toner image on a surface of the image bearer according to image formation conditions; a transfer unit including a transfer member, that transfers the toner image on the surface of the image bearer to a recording medium at a transfer nip between the image bearer and the transfer member; a toner adhesion amount detection unit that detects a toner adhesion amount of a toner pattern transferred from the image bearer to the transfer member; an image formation condition adjustment unit that adjusts the image formation condition, based on a detection result of the toner adhesion amount detection unit; a transfer pressure setting change unit that changes a transfer pressure setting of the transfer nip; and a correction unit that corrects an adjustment value of the image formation condition adjustment unit, based on a correction value corresponding to a changed transfer pressure setting by the transfer pressure setting change unit.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a flowchart illustrating a processing of calculating a correction value corresponding to a changed secondary transfer nip pressure setting; and FIG. 12 is an explanatory diagram illustrating setting items for each type of recording sheet.

Figure 1:
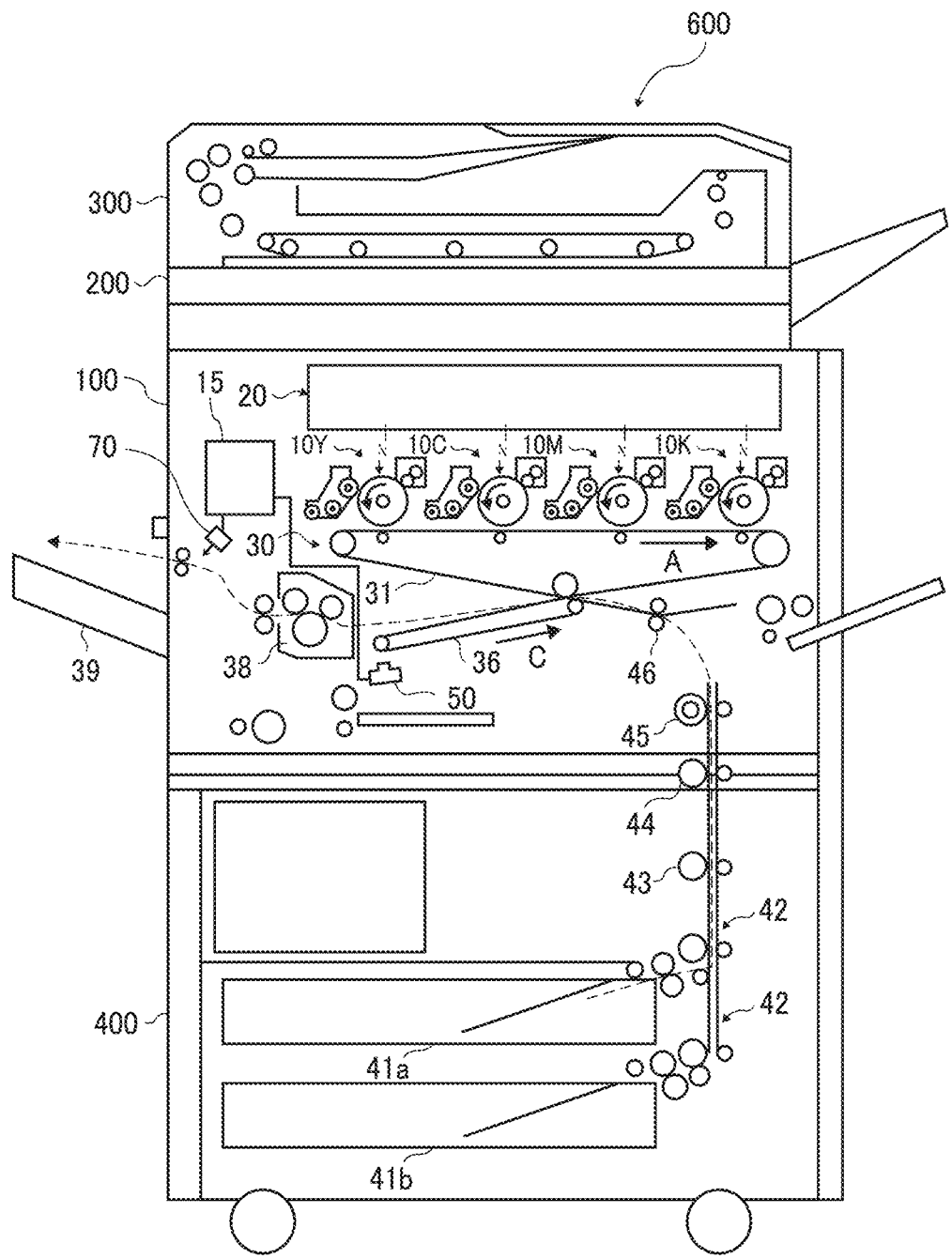
FIG. 1 is a schematic diagram of a copier according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to embodiments of the present invention, the relationship between a detection result of a toner adhesion amount detection unit and an image density of an output image is prevented from being collapsed even when a transfer pressure setting is changed, thereby avoiding the situation where the image density of the output image deviates from a target density.

The following description relates to a copier serving as an electrophotographic image forming apparatus according to embodiments of the present invention.

Embodiments of the present invention are not limited to copiers, and include other image forming apparatuses such as printers.

First, a basic configuration of the copier according to this embodiment will be explained.

FIG. 1 is a schematic diagram of a copier 600 according to this embodiment.

Figure 2:
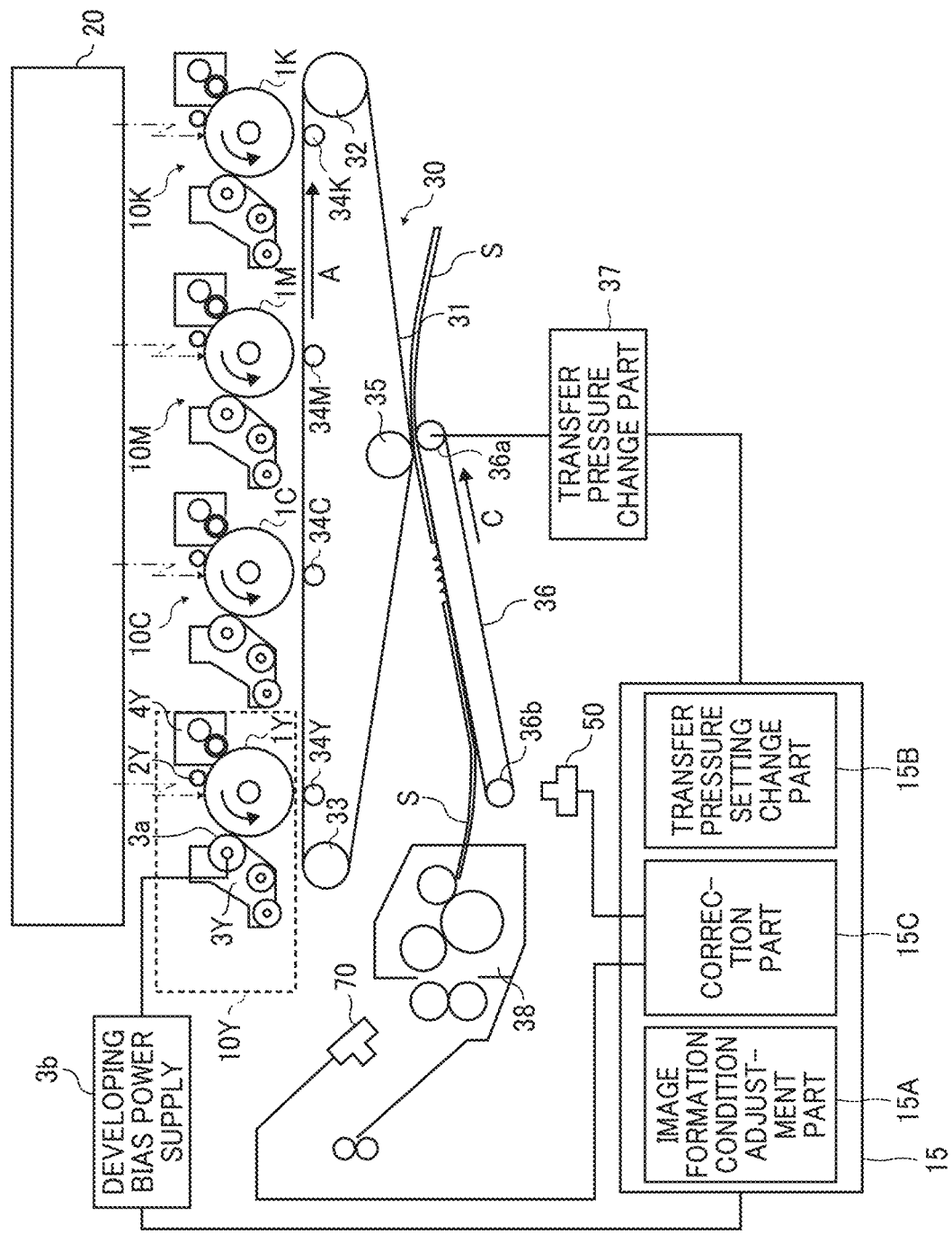
FIG. 2 is a schematic configuration diagram illustrating an image former of the copier of FIG. 1.

FIG. 2 is a schematic configuration diagram illustrating an image former 100 of the copier 600 according to this embodiment.

The copier 600 according to this embodiment includes an image former 100 as an image forming unit, a paper feeder 400 as a recording sheet supplying unit, a scanner 200 as an image reading unit, and an automatic document conveyance device 300 as a document supplying unit.

The image former 100 forms an image on a recording sheet. The paper feeder 400 supplies a recording sheet to the image former 100. The scanner 200 scans a document image and generates image data. The automatic document conveyance device 300 automatically feeds a document sheet to the scanner 200.

Inside the housing of the copier 600, there is arranged a transfer unit 30 in which a plurality of support rollers support an endless intermediate transfer belt 31 being an intermediate transfer body as an image bearer. As a plurality of support rollers, there are a drive roller 32, a driven roller 33, and a secondary transfer backup roller 35, which are rotated and driven by a drive unit.

The intermediate transfer belt 31 is made of, for example, a material in which carbon powder to adjust electrical resistance is dispersed in a polyimide resin with low elongation. The intermediate transfer belt 31 is supported by the drive roller 32, the secondary transfer backup roller 35, the driven roller 33, and four primary transfer rollers 34 (including 34Y, 34C, 34M, and 34K) arranged inside its loop, and moves endlessly in the clockwise direction (arrow A direction) in FIG. 2 as the drive roller 32 rotates.

The primary transfer rollers 34Y, 34C, 34M, and 34K, to each of which a primary transfer bias being output from a primary transfer power supply is applied, sandwich the intermediate transfer belt 31 between drum-shaped photoconductors 1Y, 1C, 1M, and 1K, which are latent image bearers, and form respective primary transfer nips for yellow (Y), cyan (C), magenta (M), and black (K). Yellow (Y), cyan (C), magenta (M), and black (K) toner images formed on the surfaces of the photoconductors 1Y, 1C, 1M, and 1K are primarily transferred to an outer circumferential surface of the intermediate transfer belt 31 at the primary transfer nip for Y, C, M, and K.

Above image formation units 10Y, 10C, 10M, and 10K, there is arranged an optical writing unit 20 as a latent image writing unit. The optical writing unit 20 emits four writing light beams by driving four semiconductor lasers (LDs) by a laser controller, based on information on an image input and to be output. The image formation units 10Y, 10C, 10M, and 10K have the photoconductors 1Y, 1C, 1M, and 1K, respectively. Hereafter, subscripts Y, C, M, and K may be omitted when describing matters common to each color, without distinguishing among the Y, C, M, and K colors.

Around the photoconductor 1 of the image formation unit 10, there are arranged a charging unit 2, a developing unit 3, and a cleaning unit 4. The photoconductor 1 is uniformly charged by the charging unit 2 when its surface passes through the position opposite the charging unit 2 as it rotates in the counterclockwise direction in FIG. 2. The uniformly charged surface of the photoconductor 1 is optically scanned in the dark by the writing light emitted from the optical writing unit 20, which attenuates the potential of the exposed area exposed to the writing light and forms an electrostatic latent image.

The optical writing unit 20 has a semiconductor laser (LD) as a light source, an optical deflector such as a polygon mirror, a reflective mirror, and an optical lens. The optical writing unit 20 reflects laser light emitted from the semiconductor laser with the reflective mirror or passes the laser light through the optical lens while using the optical deflector to deflect the laser light, thereby performing optical scanning of the respective surfaces of the four photoconductors 1Y, 1C, 1M, and 1K. This writes electrostatic latent images for Y, C, M, and K on the respective surfaces of the four photoconductors 1Y, 1C, 1M, and 1K. As the optical writing unit 20, a light-emitting diode (LED) array as a light source may be used to perform optical scanning, instead of one that performs optical scanning by the laser light emitted from the semiconductor laser.

The four image formation units 10Y, 10C, 10M, and 10K have an almost similar configuration to each other except that the image formation units use different colors of toner. The developing unit 3 of the image formation unit 10 applies a developing bias from a developing bias power supply 3b to a developing roller 3a as a developer bearer, thereby causing the toner borne on the developing roller 3a to adhere to the exposed area on the photoconductor 1 and developing the latent image. The photoconductor 1 and the developing roller 3a, which are mutually rotatable, face each other through a predetermined gap (developing gap). The cleaning unit 4 cleans the transfer residual toner adhered on the surface of the photoconductor 1 having passed through the primary transfer nip.

The electrostatic latent image written on the photoconductor 1 by the optical writing unit 20 is developed by the developing unit 3 into a toner image. The toner images on the photoconductor 1 are superimposed sequentially on the outer circumferential surface of the intermediate transfer belt 31 for primary transfer. In this way, a four-color superimposed toner image is formed on the intermediate transfer belt 31.

Of the entire area in the outer circumferential surface of the intermediate transfer belt 31, the portion where the intermediate transfer belt is laid around the secondary transfer backup roller 35 is in contact with a transfer belt 36 as a transfer member, and forms a secondary transfer nip.

Recording sheets are fed into a paper feeding passage 42 from any one of paper feeding trays 41a, 41b arranged in multiple stages in the paper feeder 400. The recording sheet fed into the paper feeding passage 42 passes through a first conveyance roller pair 43, a second conveyance roller pair 44, and a third conveyance roller pair 45, and is then conveyed to a registration roller pair 46. The registration roller pair 46 feeds the recording sheet, which is sandwiched between the rollers, at a timing that the recording sheet overlays the four-color superimposed toner image on the outer circumferential surface of the intermediate transfer belt 31 in the secondary transfer nip. In the secondary transfer nip, the four-color superimposed toner image on the intermediate transfer belt 31 is secondarily transferred to the recording sheet in a batch and becomes a full-color image on the recording sheet by actions of the secondary transfer electric field and nip pressure that are caused by the secondary transfer bias applied to the secondary transfer backup roller 35.

The recording sheet that has passed through the secondary transfer nip moves and is sent to a fixing unit 38 while being held on the front side of the transfer belt 36. In the fixing unit 38, full-color images are fixed to the surface of the recording sheet by the action of fixing nip pressure and heating. The recording sheet is then ejected to an external paper ejection tray 39 or the like.

The copier 600 includes a controller 15, as illustrated in FIG. 1. This controller 15 includes a central processing unit (CPU) consisting of a microcomputer or the like that performs various controls to be described below, various control circuits, input/output devices, clocks, timers, a storage unit (storage part) consisting of non-volatile memory and volatile memory, and the like. Various control programs and a variety of pieces of information such as outputs from various sensors and various calculation data are stored in the storage part of the controller 15.

Figure 3:
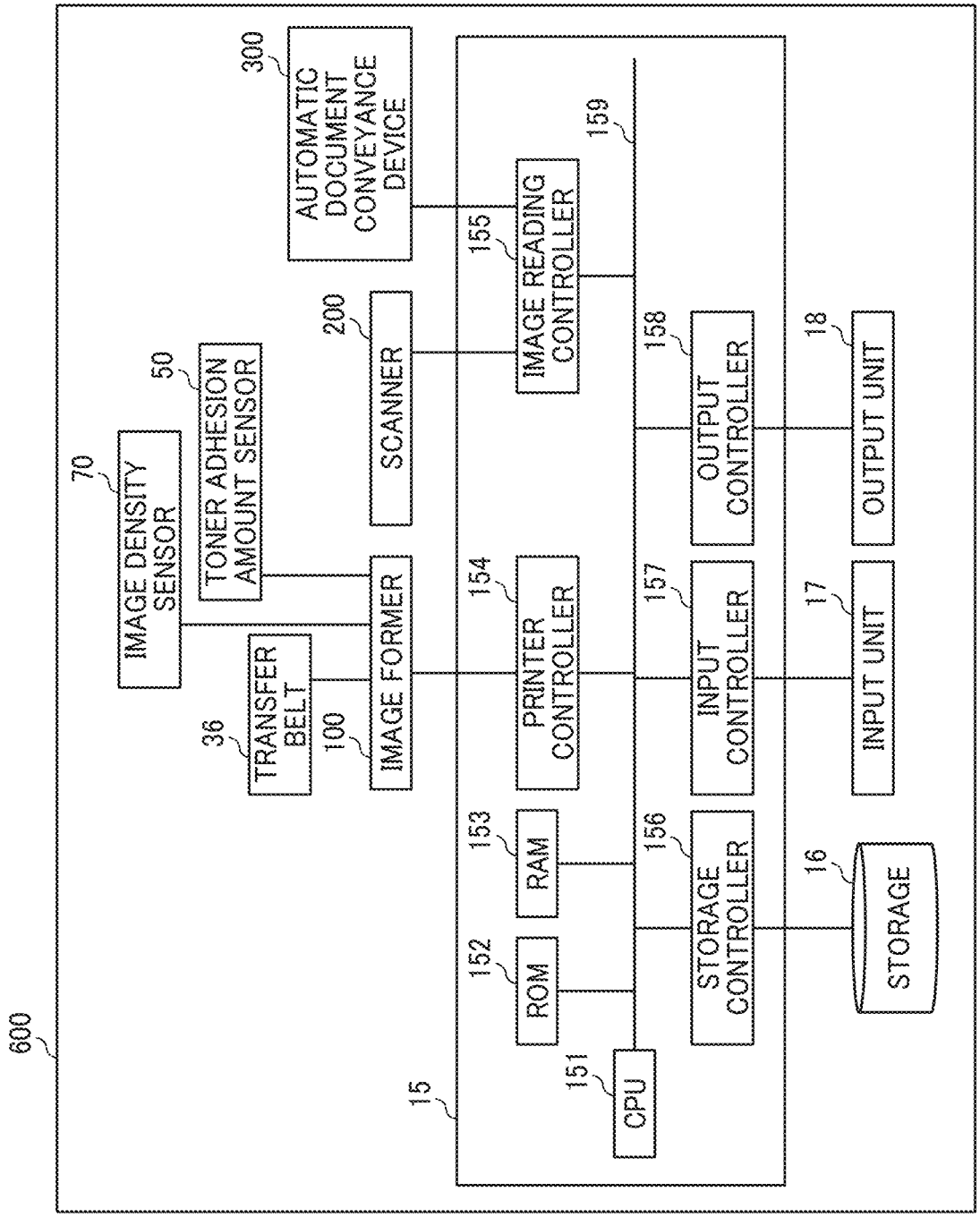
FIG. 3 is a block diagram illustrating a hardware configuration of the copier of FIG. 1 including a controller.

FIG. 3 is a block diagram illustrating a hardware configuration including the controller 15 in the copier 600 in this embodiment.

The controller 15 includes a read-only memory (ROM) 152, a random-access memory (RAM) 153, a printer controller 154, an image reading controller 155, a storage controller 156, an input controller 157, and an output controller 158. The parts that make up the controller 15 are connected by a bus 159.

In addition to the image former 100, scanner 200, and automatic document conveyance device 300, the copier 600 includes hardware such as a storage 16, an input unit 17, and an output unit 18. The printer controller 154, the image reading controller 155, the storage controller 156, the input controller 157, and the output controller 158 of controller 15 serve as interfaces for CPU 151 to control each piece of hardware.

The controller 15, including the CPU 151, controls the entire copier 600. The CPU 151 starts an operating system (OS) with a boot program stored in the ROM 152. The CPU 151 then executes a control program stored in the storage 16 and the ROM 152 on the OS.

The RAM 153 is used as a temporary storage area such as main memory or a work area of the CPU 151. The storage 16 is a readable/writable non-volatile storage device such as a hard disk drive (HDD). This storage 16 stores a variety of pieces of data, including programs for controlling the entire copier 600, various application programs, data for managing consumable parts, a video showing a series of operations required to resolve a maintenance event, and the like. The CPU 151 accesses the storage 16 via the storage controller 156.

The CPU 151 controls the copier 600 by reading a control program and an application program from the storage 16 and the ROM 152 and executing a program developed in the RAM 153. Thus, hardware such as the CPU 151, the ROM 152, the RAM 153, and the storage 16, which make up the controller 15, constitutes a so-called computer.

In the copier 600 according to this embodiment, one CPU 151 executes each processing to be described below by using a program developed in one memory (RAM 153), but other forms are also acceptable. For example, a plurality of processors, RAM, ROM, and a storage may be made to cooperate to execute each processing to be described below. In addition, some of the processing may be executed by using hardware circuits such as application-specific integrated circuit (ASIC) and field-programmable gate array (FPGA).

The CPU 151 controls the scanner 200 via the image reading controller 155, reads images on the document, and generates image data. The CPU 151 forms an image on a sheet (recording medium) such as a paper sheet in cooperation with the printer controller 154 and the parts of the image former 100.

The input controller 157 connects the input unit 17 to the controller 15 and receives a user operation instruction from the input unit 17, such as a touch panel or hard keys. The output controller 158 connects the output unit 18 to the controller 15 and controls the output unit 18, which includes a display such as a liquid crystal display (LCD) or cathode-ray tube (CRT), and displays an operation screen and a video to the user. In this embodiment, the output unit 18 is described as a display that provides display output, but the output unit 18 may include a speaker that provides audio output in addition to the display output. The input unit 17 may include a microphone for voice input, in addition to a touch panel or hard keys.

Figure 4:
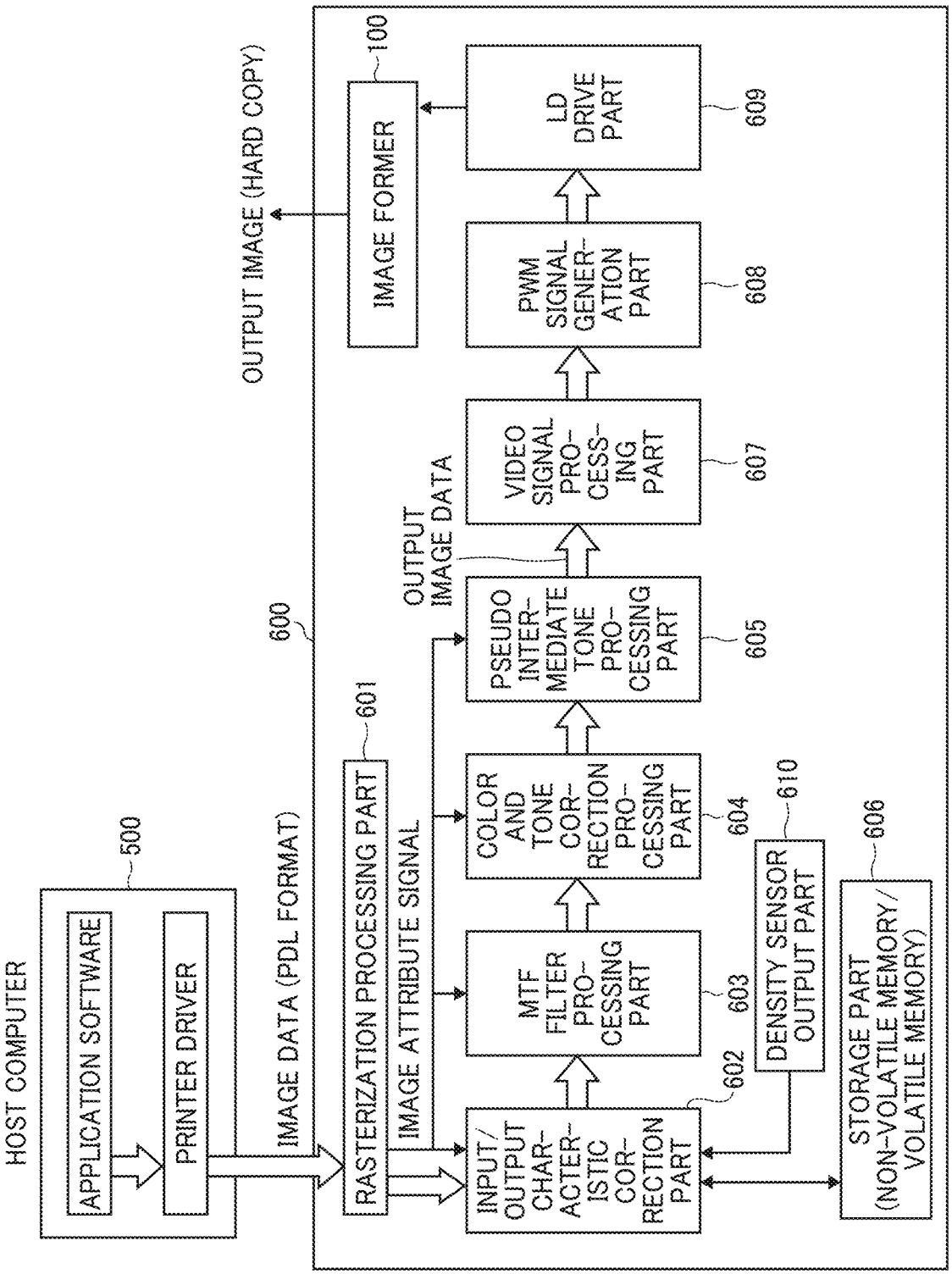
FIG. 4 is a block diagram illustrating a flow of image data processing performed by the copier of FIG. 1.

FIG. 4 is a block diagram illustrating a flow of image data processing performed by the copier 600 according to this embodiment.

Image data passed from application software on an external host computer 500 to a printer driver are output to the copier 600. At this time, the image data are converted to Page Description Language (PDL) by the printer driver. When the image data described by the PDL are input as input data, the data are interpreted in a rasterization processing part 601 and a raster image is formed. As for each object, a signal is generated that indicates a type or an attribute of each object, for example, text, line, photo, or graphics image. The signals are output to an input/output characteristic correction part 602, a modulation transfer function (MTF) filter processing part 603, a color and tone correction processing part 604, and a pseudo intermediate tone processing part 605.

In the input/output characteristic correction part 602, each tone value in the raster image is corrected in such a way as to acquire desired characteristics by an input/output characteristic correction signal. The input/output characteristic correction part 602 uses an output from a density sensor output part 610 and transfers information to/from a storage part 606 consisting of non-volatile memory and volatile memory, thereby generating an input/output characteristic correction signal and performing a correction operation. The generated input/output characteristic correction signal is stored in the non-volatile memory of the storage part 606 and used for the next image formation.

In the MTF filter processing part 603, enhancement processing is performed with an optimal filter selected for each attribute according to attribute signals sent from the rasterization processing part 601. Since MTF filter processing is identical to the well-known technology, a detailed explanation is omitted. The image data after the MTF filter processing are handed over to the next step, the color and tone correction processing part 604.

In the color/tone correction processing part 604, various kinds of correction processing are performed, including the following color correction and tone correction.

In the color correction, color conversion is performed from a RGB color space, which is a PDL color space being input from the host computer 500, to a CMYK color space, which is a color space consisting of the toner colors to be used in the image former 100. This color correction is performed by using optimal color correction coefficients for each attribute according to the attribute signals sent from the rasterization processing part 601.

In the tone correction, tone correction processing is performed to correct image data of multi-tone images to be output, based on tone characteristic data prepared based on results of detecting the image density of each part to be tested in a tone pattern image with, for example, a toner adhesion amount sensor 50.

After the image data are processed in the color and tone correction processing part 604, the image data are handed over to the pseudo intermediate tone processing part 605.

The pseudo intermediate tone processing part 605 performs pseudo intermediate tone processing and generates output image data. For example, pseudo intermediate tone processing is performed by a dither method on data that have processed color correction and tone correction. Specifically, quantization is performed by making comparative references with a pre-stored dither matrix.

The output image data being output from the pseudo intermediate tone processing part 605 are processed by a video signal processing part 607 and converted to a video signal. Based on this video signal, a PWM (pulse width modulation) signal is generated as a light source control signal in a PWM signal generation part 608. An LD drive part 609 outputs an LD drive signal that drives a semiconductor laser (LD) as a light source of the optical writing unit 20, based on the PWM signal received from the PWM signal generation part 608.

Figure 5:
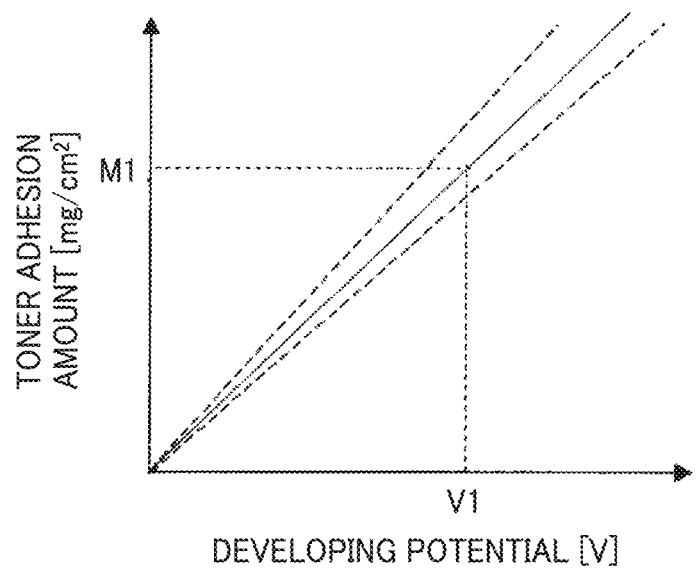
FIG. 5 is a graph illustrating a relationship between a toner adhesion amount and a developing potential.

FIG. 5 is a graph illustrating a relationship between a toner adhesion amount and a developing potential (difference between a developing bias and an exposure area potential).

In general, a relationship between a developing potential during image forming and a toner adhesion amount (amount of toner per unit area) in a formed toner image is proportional, as illustrated in FIG. 5. A slope in this graph is called a development γ. In the state illustrated by a solid line in FIG. 5, the amount of toner adhesion can be set to a target value M1 by adjusting the developing potential, which is an image formation condition, to V1 [V], and a target image density can be acquired on the output image.

The development γ varies due to fluctuation in an ambient environment and degradation of the image former. Therefore, even when a proper image density is acquired at the beginning of the image forming operation, as the image forming operation continues (during continuous image forming operation), the development γ may fluctuate, as illustrated by dashed lines in FIG. 5. When such fluctuations occur, when the developing potential remains at V1 [V], the amount of toner adhesion deviates from the target value M1, and the target image density cannot be acquired. Because such a deviation in image density occurs for each color, which has a significant impact on color quality of a secondary color and a tertiary color in which the colors are overlaid, resulting in a significant degradation of image quality.

Therefore, an image formation condition adjustment part 15A as an image formation condition adjustment unit of the controller 15 according to this embodiment forms a toner pattern of each color, for example, such that a toner adhesion amount of the target value M1 can be acquired, at a predetermined timing in a non-image area (an area between paper sheet) between images (between paper sheets) during continuous image forming operation. Each color toner pattern formed in the area between paper sheets is transferred from the intermediate transfer belt 31 onto the transfer belt 36, and the toner adhesion amount of each color toner pattern on the transfer belt 36 is detected by the toner adhesion amount sensor 50. When a detection result of this toner adhesion amount sensor 50 deviates from the target value M1, the image formation condition adjustment part 15A adjusts the image formation condition (e.g., developing potential, development γ) in such a way that the toner adhesion amount approaches the target value M1. Specifically, for example, the developing bias power supply 3b is controlled to adjust the developing bias in such a way that the toner adhesion amount approaches the target value M1. This allows the image formation condition to be adjusted to maintain the target image density even in a situation where the target image density may not be achieved due to fluctuations of an environment.

Figure 6:
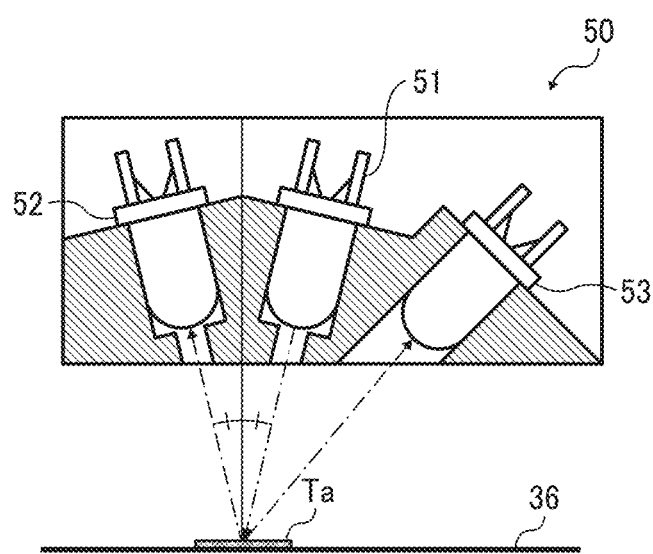
FIG. 6 is a schematic configuration diagram illustrating a toner adhesion amount sensor.

FIG. 6 is a schematic configuration diagram illustrating the toner adhesion amount sensor 50.

As illustrated in FIG. 6, the toner adhesion amount sensor 50 includes a light emitting element 51, which is made of a light emitting diode (LED) or the like, a regular reflection light receiving element 52, which receives regular reflection light, and a diffuse reflection light receiving element 53, which receives diffuse reflection light. The light emitting element 51 emits light onto the transfer belt 36. The regular reflection light receiving element 52 receives the regular reflection light of reflection light reflected on the transfer belt 36, and the diffuse reflection light receiving element 53 receives the diffuse reflection light of the reflection light reflected on the transfer belt 36.

The toner adhesion amount sensor 50 is installed near the surface of the transfer belt 36 and detects the amount of reflected light reflected by a toner pattern Ta on the surface of the transfer belt 36 with the regular reflection light receiving element 52 and the diffuse reflection light receiving element 53. The output from the toner adhesion amount sensor 50, i.e., the amount of light received by the regular reflection light receiving element 52 (regular reflection light amount) and the amount of light received by the diffuse reflection light receiving element 53 (diffuse reflection light amount), is converted to a toner adhesion amount by a predetermined adhesion amount conversion algorithm. As for the adhesion amount conversion algorithm, an algorithm similar to the conventional techniques can be used.

The image formation condition adjustment part 15A of the controller 15 performs adjustment processing to adjust the image formation condition (e.g., developing potential, development γ) at a predetermined timing during continuous image forming operation. In this adjustment processing, the toner pattern Ta is formed in the area between paper sheets, transferred from the intermediate transfer belt 31 to the transfer belt 36, and the toner adhesion amount of the toner pattern Ta is detected by the toner adhesion amount sensor 50. Then, based on the detection result, the image formation condition adjustment part 15A changes (adjusts) the image formation condition (e.g., developing potential, development γ) for Y, C, M, and K, respectively, individually. This allows the target image density to be acquired for each color.

Generally, a known image quality adjustment method for image forming apparatus is to change settings for a secondary transfer nip pressure (transfer pressure) by a transfer pressure setting change part 15B of the controller 15, which controls a transfer pressure change part 37. The transfer pressure change part 37 includes, for example, two rollers 36a and 36b that tension the transfer belt 36, by a displacement mechanism that displaces the roller 36a, which presses the transfer belt 36 against the secondary transfer backup roller 35, in a direction bringing into a contact or separating from the secondary transfer backup roller 35. A method of changing a secondary transfer nip pressure setting is an effective method for adjusting image quality, especially when images are formed on recording sheets of different thicknesses. For example, when settings (paper settings) for image formation conditions and secondary transfer nip pressure (transfer pressure), which depend on a type (thickness, etc.) of the recording sheet, are stored, the paper settings corresponding to the paper settings to be used are read out, and then, the image formation condition adjustment part 15A and the transfer pressure setting change part 15B may perform image forming by changing the settings for the image formation conditions and secondary transfer nip pressure (transfer pressure). For example, when a user wants to adjust an image density after viewing an output image, the user may operate an operation panel (a reception unit) of the image forming apparatus, and the like, and the transfer pressure setting change part 15B may change the secondary transfer nip pressure (transfer pressure) setting according to the operation details.

However, when the secondary transfer nip pressure setting is changed in this manner, the image density of the output image may deviate from a target density. This is caused by the fact that a surface state of the toner pattern Ta on the transfer belt 36 changes as the secondary transfer nip pressure varies.

Figure 7A:
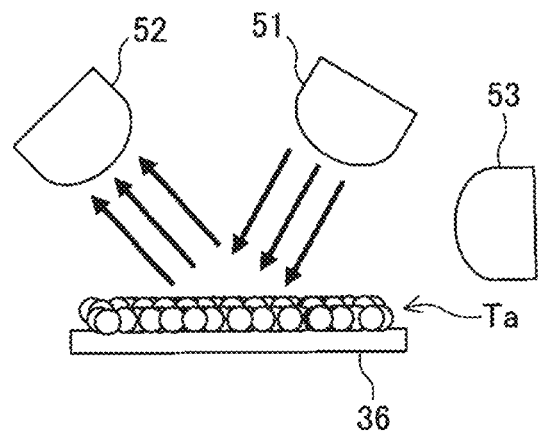
FIG. 7A is an explanatory diagram illustrating a surface state of a toner pattern transferred onto a transfer belt in a state that secondary transfer nip pressure is high.
Figure 7B:
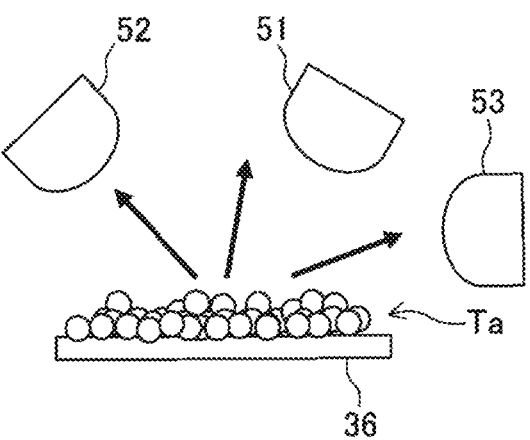
FIG. 7B is an explanatory diagram illustrating a surface state of the toner pattern transferred onto the transfer belt in a state that the secondary transfer nip pressure is low.

FIG. 7A is an explanatory diagram illustrating a surface state of the toner pattern Ta transferred onto the transfer belt 36 with high secondary transfer nip pressure, and FIG. 7B is an explanatory diagram illustrating a surface state of the toner pattern Ta transferred onto the transfer belt 36 with low secondary transfer nip pressure.

When the secondary transfer nip pressure is set high, a force pressing the toner pattern Ta during transfer to the transfer belt 36 is strong, and therefore, the surface state of the toner pattern Ta is relatively high in smoothness (small surface roughness), as illustrated in FIG. 7A. By contrast, when the secondary transfer nip pressure is set low, the force pressing the toner pattern Ta during transfer to the transfer belt 36 is weak, and therefore, the surface state of the toner pattern Ta is relatively low in smoothness (large surface roughness), as illustrated in FIG. 7B.

When there is a difference in the surface state of the toner pattern Ta, the detection results of the toner adhesion amount sensor 50 will differ even when the toner pattern has the same amount of toner adhered (i.e., the toner pattern has the same image density in the output image). In other words, in a state with relatively high smoothness (small surface roughness) as illustrated in FIG. 7A, an amount of regular reflection light regularly reflected by the toner pattern Ta is large, and an amount of diffuse reflection light diffusely reflected by the toner pattern Ta is small. By contrast, as illustrated in FIG. 7B, in a state with relatively low smoothness (large surface roughness), the amount of the regular reflection light regularly reflected by the toner pattern Ta is small, and the amount of the diffuse reflection light diffusely reflected by the toner pattern Ta is large. Because of these differences, when there is a difference in the surface state of the toner pattern Ta, the detection results of the toner adhesion amount sensor 50 will be different even when the toner patterns have the same amount of toner adhered.

Therefore, a relationship between the detection result of the toner adhesion amount sensor 50 (a sensor output value) and the image density of the output image is broken. When the image formation condition adjustment part 15A of the controller 15 adjusts the image formation conditions, based on the detection results of the toner adhesion amount sensor 50 in a situation where this relationship is broken, a situation will arise where the image density of the output image deviates from the target density.

Therefore, in this embodiment, when the setting of the secondary transfer nip pressure is changed by the transfer pressure setting change part 15B, a correction part 15C of the controller 15 uses a correction value corresponding to a changed transfer pressure setting to correct a detection result (sensor output value) of the toner adhesion amount sensor 50, which is an adjustment value used in adjusting the image formation conditions. This correction corrects the relationship between the detection result of the toner adhesion amount sensor 50 and the image density of the output image, and prevents the image density of the output image from deviating from the target density even when the secondary transfer nip pressure setting is changed.

Figure 8:
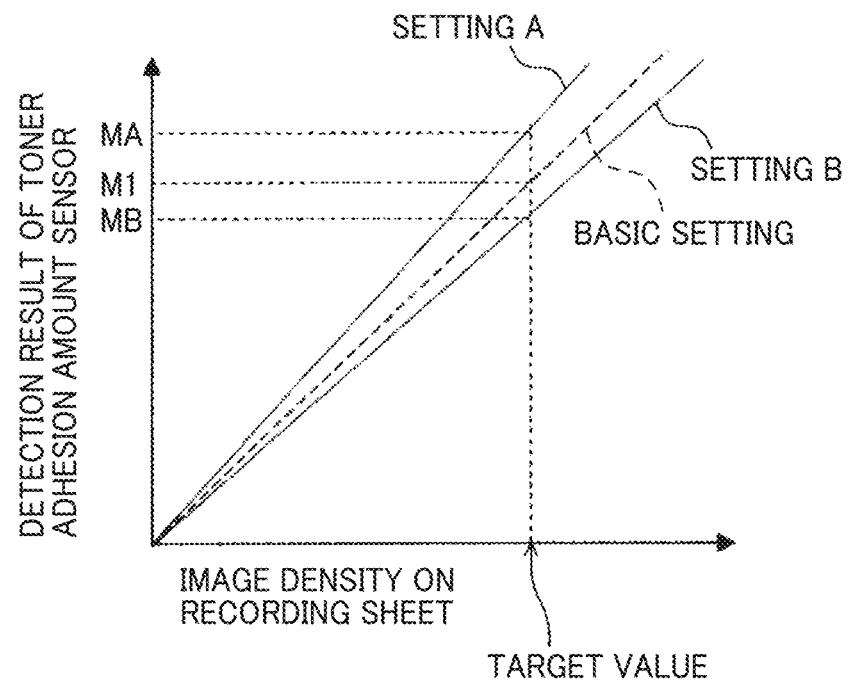
FIG. 8 is a graph illustrating a relationship between an image density of a fixed image pattern transferred onto a recording sheet and a detection result of a toner adhesion amount sensor for a toner pattern corresponding to the image pattern.

FIG. 8 is a graph illustrating a relationship between an image density of a fixed image pattern transferred onto a recording sheet (image density of the output image) and a detection result of the toner adhesion amount sensor 50 regarding the toner pattern Ta corresponding to the image pattern.

The relationship between the image density of the output image and the detection result of the toner adhesion amount sensor 50 is proportional, as illustrated in FIG. 8.

A straight line indicated by a dashed line in FIG. 8 indicates the relationship between the image density of the output image and the detection result of the toner adhesion amount sensor 50 when the secondary transfer nip pressure is at its normal value, which is a basic setting. In other words, when the secondary transfer nip pressure is at the normal value, the image density on the recording sheet (image density of the output image) becomes a target value when the detection result of the toner adhesion amount sensor 50 is M1. When the secondary transfer nip pressure is at the normal value, the image density on the recording sheet (image density of the output image) can be properly ascertained from the toner adhesion amount sensor 50 by using the relational equation corresponding to the straight line indicated by the dashed line in FIG. 8. By adjusting the image formation conditions in such a way that the detection result of the toner pattern Ta by the toner adhesion amount sensor 50 is M1, the image density of the output image can be set to the target value.

On the other hand, when the secondary transfer nip pressure is at a setting A, which is different from the normal value, the image density on the recording sheet (image density of the output image) becomes the target value when the detection result of the toner adhesion amount sensor 50 is MA (MA≠M1), as in the straight line for setting A indicated by a solid line in FIG. 8. Therefore, in a case where the secondary transfer nip pressure is set to setting A, when the image density on the recording sheet (the image density of the output image) is calculated from the detection result of the toner adhesion amount sensor 50 by using a relational equation (the straight line indicated by the dashed line in FIG. 8) where the secondary transfer nip pressure is the normal value, an image density different from the actual image density is calculated. In a case where the secondary transfer nip pressure is set to setting A, when the image formation conditions are adjusted in such a way that the result of the toner pattern Ta detected by the toner adhesion amount sensor 50 becomes the target value M1 when the secondary transfer nip pressure is the normal value, the image density of the output image deviates from the target value.

Therefore, when the secondary transfer nip pressure is at setting A, which is different from the normal value, the correction part 15C of the controller 15 uses a correction value that corrects the relational equation (the straight line indicated by the dashed line in FIG. 8) when the secondary transfer nip pressure is at the normal value to a relational equation corresponding to setting A (the straight line for setting A indicated by the solid line in FIG. 8). Specifically, a correction value α is used to correct a value of a slope corresponding to the relational equation where the secondary transfer nip pressure is at the normal value (the straight line indicated by the dashed line in FIG. 8) to a value of a slope corresponding to the relational equation corresponding to setting A (the straight line for setting A indicated by the solid line in FIG. 8).

As a result, when the secondary transfer nip pressure is at setting A, the correction part 15C of the controller 15 corrects the relational equation where the secondary transfer nip pressure is at the normal value (the straight line indicated by the dashed line in FIG. 8) with the correction value α, thereby enabling to acquire the relational equation where the secondary transfer nip pressure is at setting A (the straight line for setting A indicated by the solid line in FIG. 8). As a result, the image formation condition adjustment part 15A of the controller 15 adjusts the image formation conditions in such a way that the detection result of the toner pattern Ta by the toner adhesion amount sensor 50 is MA, and the image density of the output image can be set to the target value.

Similarly, when the secondary transfer nip pressure is at setting B, which is different from the normal value, the correction part 15C of the controller 15 corrects the relational equation where the secondary transfer nip pressure is the normal value (the straight line indicated by the dashed line in FIG. 8) with a correction value β, thereby enabling to acquire a relational equation where the secondary transfer nip pressure is at setting B (the straight line for setting B indicated by the solid line in FIG. 8). As a result, the image formation condition adjustment part 15A of the controller 15 adjusts the image formation conditions in such a way that the detection result of the toner pattern Ta by the toner adhesion amount sensor 50 is MB, and the image density of the output image can be set to the target value.

Next, an example of how to acquire the correction values α, β is described.

The correction values α, β corresponding to each value of the changeable secondary transfer nip pressure, i.e., straight lines (slope values) of settings A and B indicated by solid lines in FIG. 8, can be calculated from the detection result of the image density of the fixed image pattern transferred onto the recording sheet by the corresponding secondary transfer nip pressure (image density of the output image) and the detection result of the toner adhesion amount sensor 50 for the toner pattern Ta corresponding to the image pattern.

Figure 9:
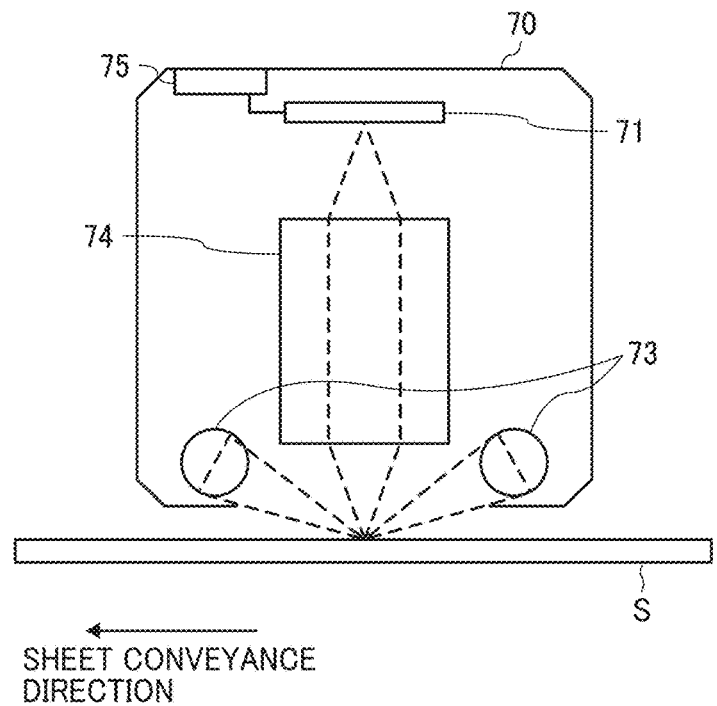
FIG. 9 is an explanatory diagram illustrating an image density sensor as an image density detection unit that detects an image density of the fixed image pattern transferred onto the recording sheet.

FIG. 9 is an explanatory diagram illustrating an image density sensor 70 as an image density detection unit that detects the image density of the fixed image pattern transferred onto the recording sheet.

Figure 10:
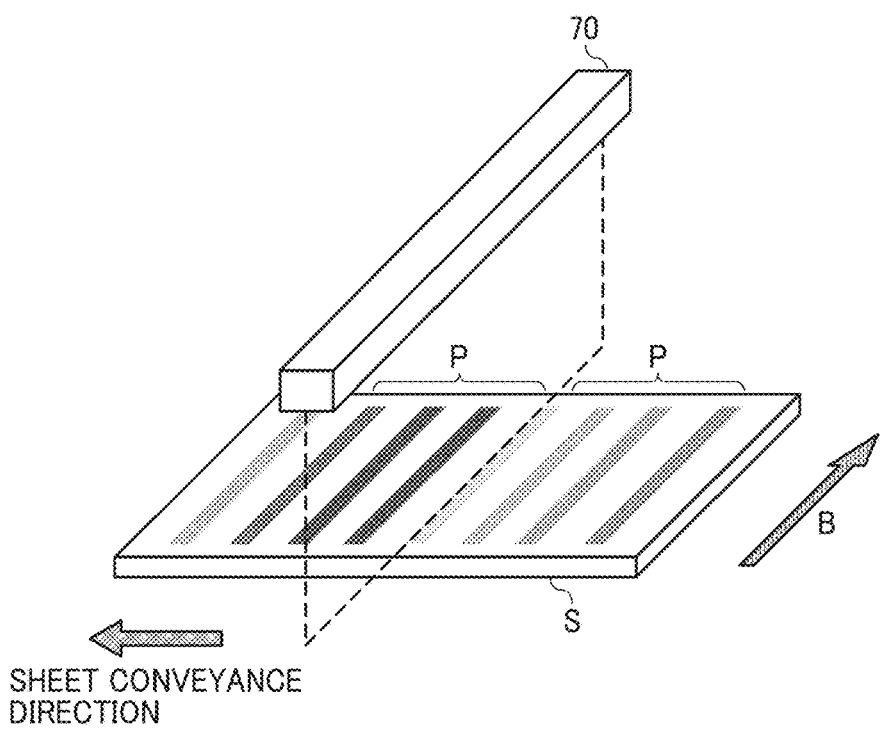
FIG. 10 is a perspective explanatory diagram of the image density sensor of FIG. 9.

FIG. 10 is a perspective explanatory diagram of the image density sensor 70.

The image density sensor 70 is installed in a sheet conveying passage between the fixing unit 38 and the paper ejection tray 39, as illustrated in FIG. 1.

The image density sensor 70 has a long shape along a main scanning direction B, as illustrated in FIG. 10. The image density sensor 70 includes an image element having a long shape in the main scanning direction B inside the housing and is sometimes referred to as a line sensor. A detection width of the image density sensor 70 in the main scanning direction B is a width indicated by a dotted line in FIG. 10. Since this detection width is longer than a main scanning direction width of a recording sheet S, when the recording sheet S is conveyed in such a way as to pass through the detection width indicated by the dotted line, it is possible to detect an image density over the entire area on the recording sheet S.

The image density sensor 70 has a light source 73, a lens array 74, and an output circuit 75, in addition to an image element 71. The dotted line represents light emitted from the light source 73. As the light source 73, a light emitting element provided at an end of a light guide body, an LED array, or the like can be used.

The light source 73 emits RGB light. As the lens array 74, a Selfoc (registered trademark) lens or the like is used.

The light emitted from the light source 73 is reflected on the recording sheet S and formed into an image by the lens array 74. The image element 71 receives the light formed into an image by the lens array 74 at each light receiving element and outputs a signal corresponding to the light received. A complementary metal oxide semiconductor (CMOS) sensor, a charge-coupled device (CCD) sensor, and the like are used as the image element 71.

FIG. 11 is a flowchart illustrating a flow of processing of calculating a correction value corresponding to the changed secondary transfer nip pressure setting.

The correction part 15C of the controller 15 executes correction value calculation processing according to the flowchart illustrated in FIG. 11 at a predetermined timing. The predetermined timing is not particularly limited as long as the processing is performed during non-image forming operation. Examples of the timing include a timing at which a user has instructed, a timing at which the setting is changed to a secondary transfer nip pressure for which the corresponding correction value has never been calculated, and the like.

When the correction part 15C of the controller 15 starts the correction value calculation processing, it first forms an image pattern P of each color in an image area and forms a toner pattern Ta in the non-image area (area between paper sheets) (S1). The image is formed in such a way that the image pattern P and the toner pattern Ta have the same amount of toner adhesion. The image pattern P and the toner pattern Ta are sequentially formed on the intermediate transfer belt 31.

The secondary transfer nip pressure is set to the secondary transfer nip pressure corresponding to the correction value acquired by the correction value calculation processing. Of the image pattern P and the toner pattern Ta formed on the intermediate transfer belt 31, the image pattern P is secondarily transferred onto the recording sheet S at the secondary transfer nip, and then conveyed to the fixing unit 38 by the transfer belt 36. On the other hand, the toner pattern Ta is transferred to the transfer belt 36 at the secondary transfer nip and conveyed to a detection area of the toner adhesion amount sensor 50.

The correction part 15C of the controller 15 detects the toner adhesion amount of the toner pattern Ta on the transfer belt 36 with the toner adhesion amount sensor 50, and acquires a result of the detection (S2). The correction part 15C of the controller 15 detects the image density of the image pattern P on the recording sheet S by the image density sensor 70, and acquires a result of the detection (S3). The correction part 15C of the controller 15 can acquire the relational equation illustrated in FIG. 8 corresponding to the secondary transfer nip pressure from these detection results of the toner adhesion amount sensor 50 and the image density sensor 70. The correction part 15C of the controller 15 calculates a correction value to correct the relational equation where the secondary transfer nip pressure is the normal value (the straight line indicated by the dashed line in FIG. 8) to a relational equation corresponding to the secondary transfer nip pressure in this correction value calculation processing (S4).

When the secondary transfer nip pressure is changed for each type of the recording sheet S, the correction value calculation processing described above may be executed for each type of the recording sheet S. In this case, as illustrated in FIG. 12, among various setting items (primary transfer bias, secondary transfer bias, secondary transfer nip pressure, secondary transfer line speed, etc.) for each type of the recording sheet S (Paper A, Paper B, and Paper C), the correction values α, β, and γ of the detection result of the toner adhesion amount sensor 50 may be provided and stored.

In the correction value calculation processing in this embodiment, the correction value is calculated by using the detection result of the image density sensor 70 installed in the copier, but is not limited to this. For example, the image pattern P on the recording sheet S being output from the copier is set in a recording sheet image density detection device provided separately from the copier to detect the image density, and the image density of the image pattern P detected by the recording sheet image density detection device may be input to the correction part 15C of the controller 15 of the copier.

The matter described above is just one example, and each of the following aspects has its own specific advantageous effect.

First Aspect

According to a first aspect, an image forming apparatus (e.g., copier 600) includes: an image bearer (e.g., intermediate transfer belt 31); an image formation unit (e.g., image formation unit 10) that forms a toner image on a surface of the image bearer according to image formation conditions (developing potential, etc.); a transfer unit (e.g., transfer unit 30) including a transfer member (e.g., transfer belt 36), that transfers the toner image on the surface of the image bearer onto a recording medium (e.g., recording sheet S) at a transfer nip between the image bearer and the transfer member; a toner adhesion amount detection unit (e.g., toner adhesion amount sensor 50) that detects a toner adhesion amount of a toner pattern Ta transferred from the image bearer to the transfer member; an image formation condition adjustment unit (e.g., image formation condition adjustment part 15A) that adjusts the image formation conditions, based on a detection result of the toner adhesion amount detection unit; a transfer pressure setting change unit (e.g., transfer pressure setting change part 15B) that changes a transfer pressure (e.g. secondary transfer nip pressure) setting of the transfer nip; and a correction unit (e.g., correction part 15C) that corrects an adjustment value of the image formation condition adjustment unit (e.g., a detected value of the toner adhesion amount sensor 50), based on correction values α, β corresponding to a changed transfer pressure setting by the transfer pressure setting change unit.

As an image quality adjustment method for the image forming apparatus, a conventional method is to change the setting of the transfer nip pressure (transfer pressure) between the image bearer and the transfer member by using a transfer pressure setting change unit. The method of adjusting image quality by changing the setting of the transfer pressure is particularly effective when forming an image on recording media of different thicknesses.

However, in an image forming apparatus that uses a toner adhesion amount detection unit to detect the toner adhesion amount of the toner pattern transferred onto the transfer member, the image density of the output image sometimes deviates from a target density when the transfer nip pressure (transfer pressure) setting is changed.

This is caused by the fact that the surface state of the toner pattern on the transfer member changes as the transfer nip pressure between the image bearer and the transfer member changes. In other words, when the transfer nip pressure is high, a force pressing the toner pattern during transfer to the transfer member is strong, and therefore, the surface state of the toner pattern is relatively high in smoothness. By contrast, when the transfer nip pressure is low, the force pressing the toner pattern during transfer to the transfer member is weak, and therefore, the surface state of the toner pattern is relatively low in smoothness. Since these differences in the surface state of the toner pattern affect a detection result of the toner adhesion amount detection unit (especially when an optical sensor that receives reflected light of the toner pattern is used), even toner patterns with the same amount of toner adhered (toner patterns with the same image density in the output image) may have different detection results. Therefore, when the transfer nip pressure setting is changed, the relationship between the detection result of the toner adhesion amount detection unit and the image density of the output image may break down. Therefore, in the image forming operation at the transfer nip pressure where this relationship is broken, the image formation conditions are adjusted by the image formation condition adjustment unit, based on the detection result of the toner adhesion amount detection unit, thereby causing the image density of the output image to deviate from the target density.

Therefore, in the present aspect, the detection result of the toner adhesion amount detection unit, which is used in the image formation condition adjustment unit, is corrected by the correction unit, based on the correction value corresponding to the changed transfer pressure setting by the transfer pressure setting change unit. According to this, this correction allows the relationship between the detection result of the toner adhesion amount detection unit and the image density of the output image to be corrected. Therefore, even when the transfer pressure setting is changed, it is possible to prevent the relationship between the detection result of the toner adhesion amount detection unit and the image density of the output image from breaking, and to prevent a situation where the image density of the output image deviates from the target density.

Second Aspect

According to a second aspect, in the image forming apparatus of the first aspect, the correction value is calculated from: the image density of a fixed image pattern P that is transferred onto a recording medium with the changed transfer pressure and then fixed on the recording medium; and a toner adhesion amount of the toner pattern Ta corresponding to the image pattern, detected by the toner adhesion amount detection unit.

According to this, since the correction value is calculated from the detection result of the toner adhesion amount detection unit actually used by the image formation condition adjustment unit in the image forming apparatus, it is possible to calculate an appropriate correction value without being affected by individual differences in the image forming apparatus.

Third Aspect

According to a third aspect, the image forming apparatus of the second aspect further includes an image density detection unit (e.g., image density sensor 70) that detects the image density of the fixed image pattern, and a calculation unit (e.g., correction part 15C) that calculates the correction value from the image density detected by the image density detection unit and the toner adhesion amount detected by the toner adhesion amount detection unit.

According to this, since the image density of the fixed image pattern can be detected by using the image density detection unit provided in the image forming apparatus, the calculation of correction values can be performed more easily and quickly than when using image density detection unit that are provided separately from the image forming apparatus.

Fourth Aspect

According to a fourth aspect, in the image forming apparatus of any of the first to third aspects, the toner adhesion amount detection unit detects a toner adhesion amount of a toner pattern prepared during continuous image forming operation, and the image formation condition adjustment unit adjusts the image formation conditions, based on the detection result of the toner adhesion amount detection unit during the continuous image forming operation.

In a case where the toner adhesion amount of the toner pattern transferred onto the transfer member is detected during the continuous image forming operation in order to maintain image quality during the continuous image forming operation, and the image forming conditions are adjusted during the continuous image forming operation, based on the detection result, even when the transfer nip pressure (transfer pressure) setting is changed, it is possible to prevent the situation where the image density of the output image deviates from the target density even when the transfer nip pressure (transfer pressure) setting is changed.

Fifth Aspect

According to a fifth aspect, in the image forming apparatus of any of the first to fourth aspects, the adjustment value is a detected value of the toner adhesion amount detection unit.

This enables to prevent a situation where the image density of the output image deviates from the target density even when the transfer nip pressure (transfer pressure) setting is changed without changing control contents of the image formation condition adjustment unit.

Sixth Aspect

According to a sixth aspect, in the image forming apparatus of any of the first or fifth aspects, the toner adhesion amount detection unit detects an amount of reflected light received from the toner pattern Ta transferred onto the transfer member as the toner adhesion amount.

The detection result of such a toner adhesion amount detection unit greatly affects the surface state of the toner pattern. According to this aspect, it is possible for even an image forming apparatus including such a toner adhesion amount detection unit to prevent a situation in which the image density of the output image deviates from the target density when the transfer pressure setting is changed.

Seventh Aspect

According to a seventh aspect, the image forming apparatus of any of the first to sixth aspects further includes a reception unit (e.g., operation panel) that receives a user instruction, wherein the transfer pressure setting change unit changes the transfer pressure setting, based on the user instruction received by the reception unit.

This enables to suppress a situation where the image density of the output image deviates from the target density even when the transfer pressure setting is changed based on the user instruction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:
    an image bearer;
    an image formation unit that forms a toner image on a surface of the image bearer according to image formation conditions;
    a transfer unit including a transfer member, that transfers the toner image on the surface of the image bearer to a recording medium at a transfer nip between the image bearer and the transfer member;
    a toner adhesion amount detection unit that detects a toner adhesion amount of a toner pattern transferred from the image bearer to the transfer member;
    an image formation condition adjustment unit that adjusts the image formation conditions, based on a detection result of the toner adhesion amount detection unit;
    a transfer pressure setting change unit that changes a transfer pressure setting of the transfer nip; and
    a correction unit that corrects an adjustment value of the image formation condition adjustment unit, based on a correction value corresponding to a changed transfer pressure setting by the transfer pressure setting change unit.

2. The image forming apparatus according to claim 1, wherein the correction value is calculated from:
    an image density of a fixed image pattern that is transferred onto a recording medium with the changed transfer pressure and then fixed on the recording medium; and
    a toner adhesion amount of a toner pattern corresponding to the image pattern, detected by the toner adhesion amount detection unit.

3. The image forming apparatus according to claim 2, further comprising:
    an image density detection unit that detects the image density of the fixed image pattern; and
    a calculation unit that calculates the correction value from the image density detected by the image density detection unit and the toner adhesion amount detected by the toner adhesion amount detection unit.

4. The image forming apparatus according to claim 1, wherein
    the toner adhesion amount detection unit detects a toner adhesion amount of a toner pattern prepared during a continuous image forming operation, and
    the image formation condition adjustment unit adjusts the image formation conditions, based on a detection result of the toner adhesion amount detection unit during the continuous image forming operation.

5. The image forming apparatus according to claim 1, wherein the adjustment value is a detected value of the toner adhesion amount detection unit.

6. The image forming apparatus according to claim 1, wherein the toner adhesion amount detection unit detects an amount of reflected light received from a toner pattern transferred to the transfer member as the toner adhesion amount.

7. The image forming apparatus according to claim 1, further comprising a reception unit that receives a user instruction,
   wherein the transfer pressure setting change unit changes the transfer pressure setting, based on the user instruction received by the reception unit.

* * * * *